United States Patent
Woodruff (10) Patent No.: US 6,971,205 B2
(45) Date of Patent: Dec. 6, 2005

(54) PLANT CONTAINERS

(76) Inventor: Keith E. Woodruff, 1331 Summit La., Mountainside, NJ (US) 07092

( * ) Notice: Subject to any disclaimer, the term of this patent is extended or adjusted under 35 U.S.C. 154(b) by 84 days.

(21) Appl. No.: 10/668,520

(22) Filed: Sep. 23, 2003

(65) Prior Publication Data

US 2004/0065009 A1 Apr. 8, 2004

Related U.S. Application Data

(63) Continuation-in-part of application No. 09/877,746, filed on Jun. 8, 2001, now Pat. No. 6,625,927.

(51) Int. Cl.[7] ............................................. A01G 9/02
(52) U.S. Cl. ............................................. 47/65.5
(58) Field of Search ................ 47/65, 67, 68, 47/41.11

(56) References Cited

U.S. PATENT DOCUMENTS

| | | | | |
|---|---|---|---|---|
| 491,786 A | * | 2/1893 | Schurig et al. | 47/67 |
| 1,743,987 A | * | 1/1930 | Tingalia | 47/39 |
| 2,698,155 A | * | 12/1954 | Bowman | 248/311.2 |
| 4,268,994 A | * | 5/1981 | Urai | 47/79 |
| 6,079,154 A | * | 6/2000 | Farwell | 47/66.7 |
| 6,625,927 B2 | * | 9/2003 | Woodruff | 47/65.5 |

FOREIGN PATENT DOCUMENTS

| | | | | | |
|---|---|---|---|---|---|
| GB | 2239155 A | * | 6/1991 | | A01G/9/02 |
| JP | 06165621 A | * | 6/1994 | | A01G/9/02 |

* cited by examiner

*Primary Examiner*—Francis T. Palo
(74) *Attorney, Agent, or Firm*—Mark P. Stone (57) ABSTRACT

A plant container has a semi-spherical opened top cup-shaped receptacle permanently attached to a vertical back panel. The cup and back panel form a pocket for retaining soil for a plant. The back panel has at least one opening for receiving a mounting element, such as a suction cup, for removably mounting the container to a vertical supporting surface, as for example, a window pane. The back panel also defines a reservoir for water and openings in communication with the receptacle for watering a plant received in the receptacle.

17 Claims, 8 Drawing Sheets

PLANT CONTAINERS

The present application is a continuation-in-part of Ser. No. 09/877,746, filed Jun. 8, 2001 (now U.S. Pat. No. 6,625,927, issued Sep. 30, 2003), and claims the benefit of the earlier application pursuant to 35 U.S.C. Section 120.

BACKGROUND OF THE INVENTION

The present invention is directed to a removably mountable container for potted plants.

Conventional containers for plants are generally provided by pots or baskets having a flat horizontal bottom surface. The containers are supported on the horizontal bottom surface by a horizontal supporting element, as for example, a floor, a table top, a desk top, or a window sill. Such pots occupy valuable space which can be used to accommodate other articles. Additionally, it is desirable to place such containers close to windows or glass doors to provide the necessary light requirement for the plant. However, placing the containers on floor space proximate to windows or doors blocks access to the windows or doors, and placing the containers on elevated window sills creates a risk that the container will fall.

It is the primary object of the present invention to provide a plant container which is not supported on a horizontal bottom surface, but is adapted to be mounted to a vertical supporting surface including a window or glass door.

Other objects and advantages of the present invention will become apparent from the following description in conjunction with the drawings.

SUMMARY OF THE INVENTION

A plant container is formed from a cup-shaped receptacle attached to a vertical back panel to define a pocket for retaining soil. Preferably, the cup-shaped element is a truncated, semi-spherical element, and is either permanently mounted or integrally joined to the vertical back panel. Both the cup-shaped element and the back panel are preferably formed from a lightweight durable and flexible material, such as a plastic, which is also transparent to permit transmission of light therethrough to the plant retained therein. The vertical back panel of the plant container defines a reservoir for holding water. Openings are also provided for fluid communication between the reservoir and the cup-shaped receptacle for watering a plant received in the receptacle.

Means are provided for removably mounting the container to a vertical supporting surface. The mounting means include one or more suction cups mounted to the back vertical panel of the container, or in the alternative, adhesive strips mounted to the back panel of the container. In this manner, the container is removbly mountable to different vertical supporting structures, as desired by the user. For example, the container may be mounted directly to a glass door or a window pane, or may be mounted to a vertical wall in close proximity to a window or glass door. In this manner, the container is selectively movable into different positions, and does not occupy floor space, window sill space, or other horizontal space such as a desk top or table top. When direct sunlight is desired, the container is mountable directly to a window pane to receive maximum sunlight. However, when desired, the container is readily removable and mountable to a vertical supporting surface remote from a window or other light receiving locations.

Although, in the preferred embodiment of the invention the container is formed from a transparent material to permit maximum light transmission therethrough, the container may also be formed from a less light transmissive material as might be desired for the growth of a particular plant. Moreover, although in the preferred embodiment of the invention means, and in particular suction cups, are provided for removably mounting the container to a supporting surface, it is also within the scope of the invention to permanently or semi-permanently mount the plant container to a supporting surface. Such permanent and semi-permanent mounting means include known adhesives and epoxies.

DESCRIPTION OF THE BEST MODES FOR CARRYING OUT THE INVENTION

FIGS. 1–8 of the drawing illustrate the preferred embodiments of the improved plant containers in accordance with the present invention.

Figure 2:
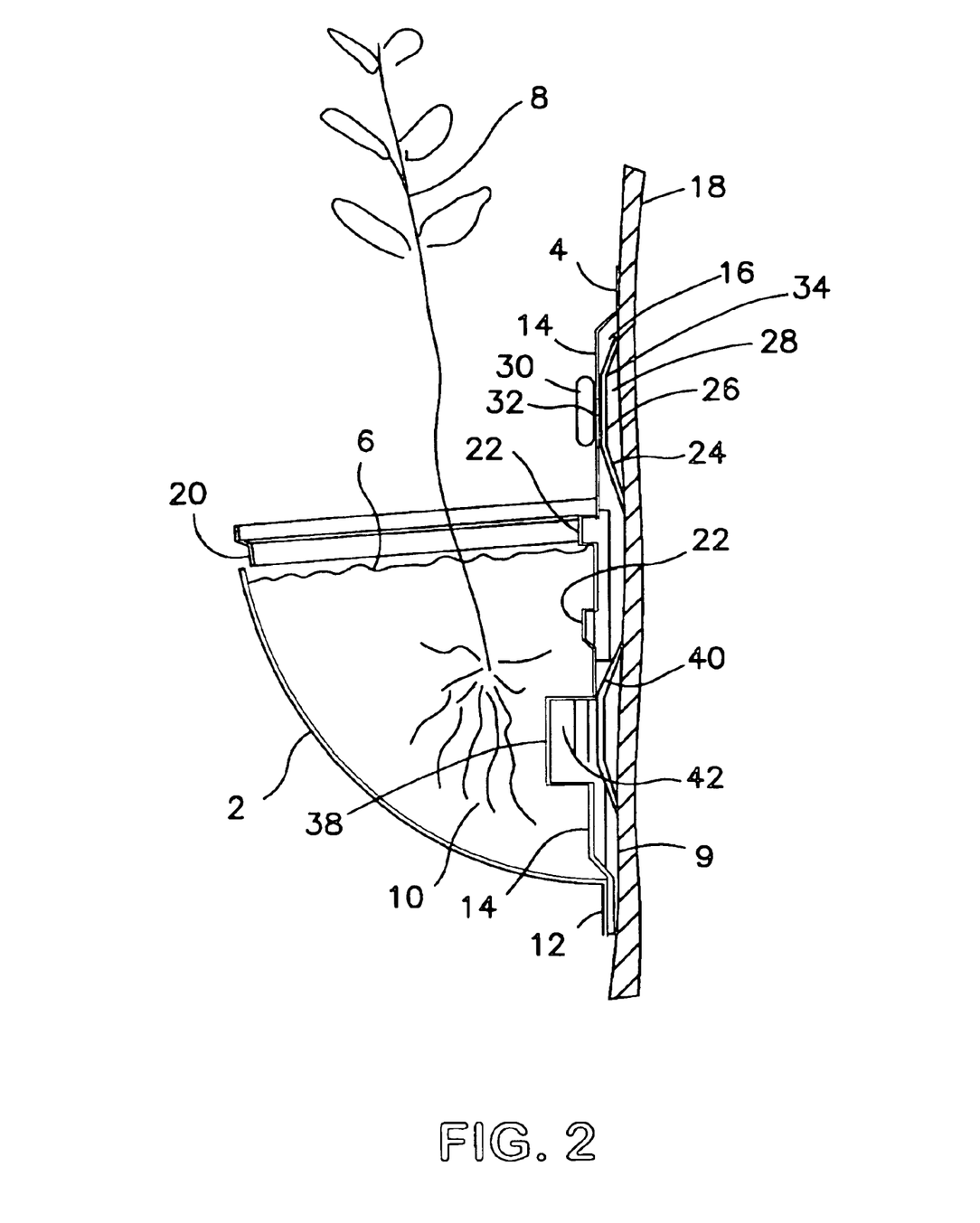
FIG. 2 illustrates a side elevational view of the plant container illustrated by FIG. 1 mounted to a vertical supporting surface.
Figure 3:
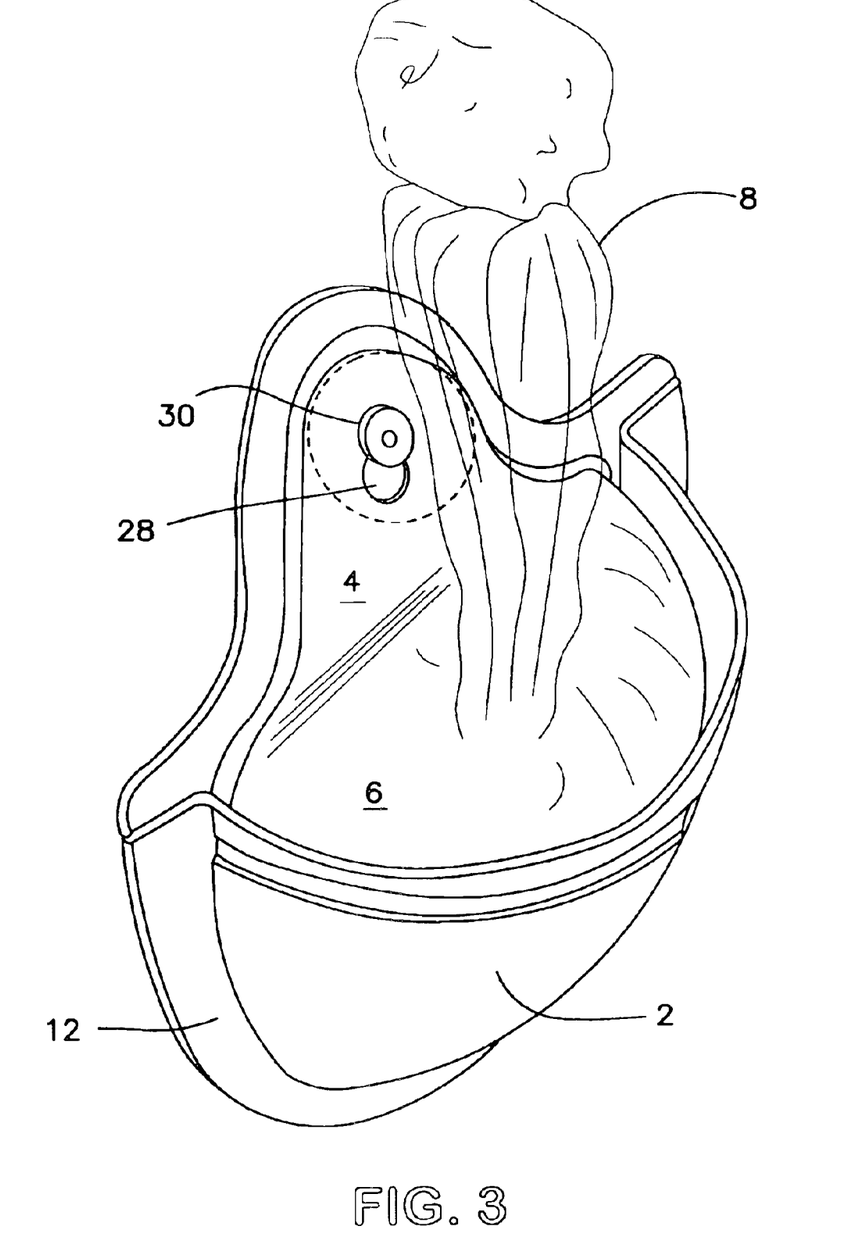
FIG. 3 is a perspective view of the plant container illustrated by FIGS. 1 and 2.

The container is formed from a generally cup-shaped element or receptacle designated by reference numeral 2, which is permanently attached to a vertical back panel designated by reference numeral 4, to form a pocket-like structure. In the alternative, the back panel 4 can be formed integrally with the cup-shaped element 2. Preferably, the cup-shaped element is an open-top truncated semi-spherical structure formed from a quarter section or quadrant of a sphere as best illustrated by FIGS. 2 and 3. Additionally, both the cup-shaped receptacle 2 and the back panel 4 are preferably formed from a durable, lightweight and resilient material, as for example, a lightweight plastic. As will be discussed in greater detail below, the material forming the cup-shaped element 2 and the back panel 4 are preferably transparent to permit maximum light transmission into the container structure.

As best illustrated by FIGS. 2 and 3, the cup-shaped receptacle 2 of the container is adapted to hold soil, the upper level of the soil in the container being designated by reference numeral 6. FIG. 2 also illustrates a plant 8, having roots 10, growing in the soil 6.

The cup-shaped receptacle 2 is joined to and merges with the back panel 4 along a flange designated by reference numeral 12. The cup-shaped portion 2 is permanently connected to the back panel 4 along the flange 12. In the alternative, the cup-shaped receptacle 2 is integrally joined to the back panel 4 along the peripheral flange 12.

As best illustrated by FIG. 2, the rear panel 4 has a center portion 14 which is indented inwardly in a direction towards the cup-shaped receptacle 2. In this manner, an air pocket or space 16 is defined between the recessed portion 14 of the back panel 4 and a vertical supporting surface 18 to which the container is mounted. Vertical supporting surface 18 is preferably a window pane or a glass door so that the plant 8 is exposed to direct sunlight transmitted through the supporting surface 18 and through the transparent back panel 4 and the cup shaped receptacle 2.

Figure 1:
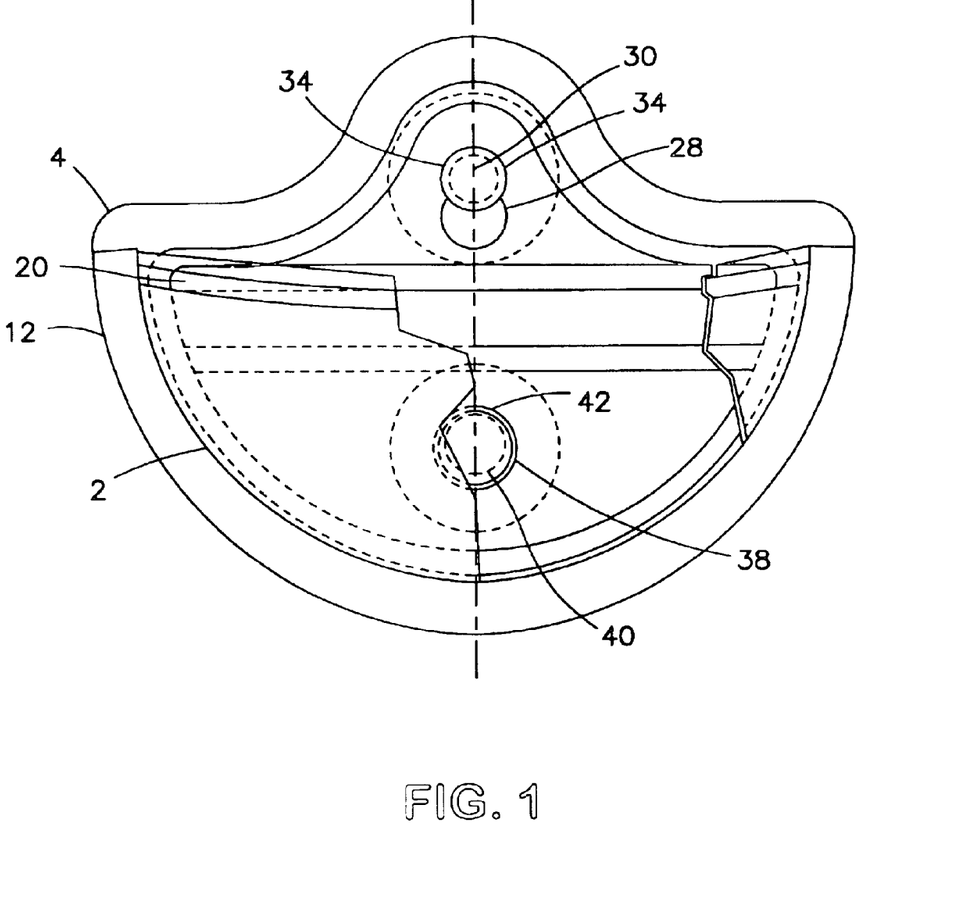
FIG. 1 illustrates a front elevational view of a plant container in accordance with the present invention.

FIGS. 1 and 2 illustrate a rib 20 extending around the periphery of the opened top of the cup-shaped receptacle 2. The rib provides rigidity to the cup-shaped receptacle and also serves to retain the soil 6 within the receptacle. As best illustrated by FIG. 2, at least one horizontally extending rib 22 is defined by the inwardly recessed portion 14 of the back panel 4. The rib 22, which is recessed inwardly in a direction into the cup-shaped receptacle 2, provides rigidity to the rear horizontal panel 4 and tends to prevent concave bowing of the rear panel 4 when the container is mounted to the vertical supporting structure 18.

In accordance with the preferred embodiment of the present invention as illustrated by FIGS. 1–3, the plant container is removably mountable to the vertical supporting surface by at least one mounting element illustrated in the drawing as upper suction cup 24. The suction cup is mounted to the plant container through an opening or slot 28 defined in the inwardly recessed portion 14 of the rear panel 4. The cup portion 26 of the suction cup extends into the space 16 defined by the recessed portion 14 of the rear panel, and faces the vertical supporting surface 18 for engagement therewith. The rear portion 30 of the suction cup extends in the opposite direction through the recessed portion 14 of the rear panel 4 such that an intermediate portion 32 in the suction cup engages an upper edge 34 defined around the slot 28 to support the rear panel 4 on the suction cup as a result of gravitational forces on the plant container when the suction cup engages the vertical supporting surface 18 to removably mount the plant container to the vertical supporting surface. In this manner, the plant container is removably mountable by the upper suction cup 24 to a predetermined location on the vertical supporting surface 18. When desired, the plant container can be removed from the suction cup, and the suction cup can be mounted to a different predetermined location for removably mounting the plant container to that different predetermined location.

In most situations, the use of a single upper suction cup 24, as discussed above, will be sufficient to removably mount the plant container to a predetermined position on the vertical supporting surface 18. If necessary, a second lower suction cup may also be employed. FIG. 2 illustrates a recessed section 38 defined near the lower end of the recessed portion 14 of the rear panel 4. The recessed portion 38 extends inwardly into the space defined by the cup-shaped receptacle 2. A second, lower suction cup, designated by reference numeral 40, extends into the recess 38, and engages the top surface 42 of the recess when the suction cup 40 is mounted to the vertical supporting surface 18. In this manner, the plant container is supported at both the upper and lower portions of the rear panel 4 when the plant container is removably mounted to the vertical supporting surface 18.

Figure 4:
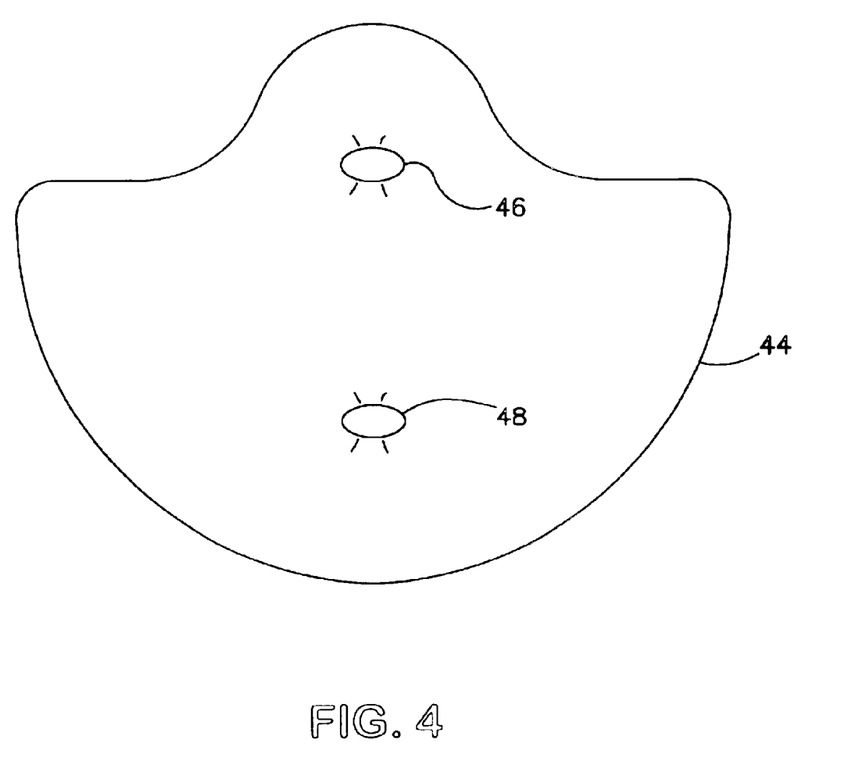
FIG. 4 illustrates a pattern used for locating the position at which the plant container in accordance with the present invention is mounted to a vertical supporting surface.

FIG. 4 illustrates a template or pattern designated by reference numeral 44, configured in the shape of the rear panel 4 of the plant container. The pattern 44 can be formed from cardboard or other suitable material. An upper opening 46, and a lower opening 48, are defined in the pattern 44. The upper opening 46 is in registration with the upper opening 28 in the recessed portion 14 of the rear panel 4, and the lower opening 48 is in registration with the lower recess 38 defined in the recessed portion 14 of the rear panel 4, when the pattern 44 is placed in registration with the rear panel 4 of the plant container. Suction cup 24 is removably receivable in the opening 46 in the pattern 44, and suction cup 40 is removably receivable in the opening 48 in the pattern 44. In this manner, the pattern 44 is used to locate the desired position at which the plant container is to be mounted to the vertical supporting surface 18. When this position is located, the suction cups received in the openings 46 and 48 of the pattern 44 are mounted to the vertical supporting surface 18, and the pattern 44 is removed from the suction cups 24 and 40. The plant container is then mounted to the vertical supporting surface 18 by inserting the rear portion 30 of suction cup 24 through the upper opening or slot 28 of the recessed portion 14 of the rear panel 4, and by inserting the rear portion of suction cup 40 into the recess 38.

It is clear from the above description that the plant container in accordance with the present invention is readily mountable to any desired vertical supporting surface, and is readily removably from a supporting surface and removably mountable to a different selected supporting surface. Preferably, the plant container is mounted to a window or glass door during daylight hours to receive maximum sunlight transmitted through the transparent rear panel 4 and cup shaped receptacle 2. This is particularly helpful to the plant during the shortened daylight hours of winter, or during days of limited sunlight. During periods of no natural sunlight, the plant container is easily removed from one mounting location and removably mountable to another location, as for example a location proximate to a lamp or other source of artificial light.

In the preferred embodiments of the invention, the rear panel 4 and the cup-shaped receptacle 2 are both formed from a transparent material to maximize the transmission of light. therethrough. However, it is within the scope of the invention to form these elements from less light transmissive materials for different types of plants which do not require maximum light exposure.

In the embodiment of the invention illustrated by FIGS. 1–4, the plant container is removably mountable to a vertical supporting surface by at least one suction cup. The use of a suction cup as the mounting means is advantageous because it does not deform the vertical supporting surface to which it is mounted, it is inexpensive, and does not require any anchor element. However, removable mounting means other than suction cups, as for example adhesive strips including Velcro material, or other known removable mounting means, are within the scope of the invention.

Figure 5:
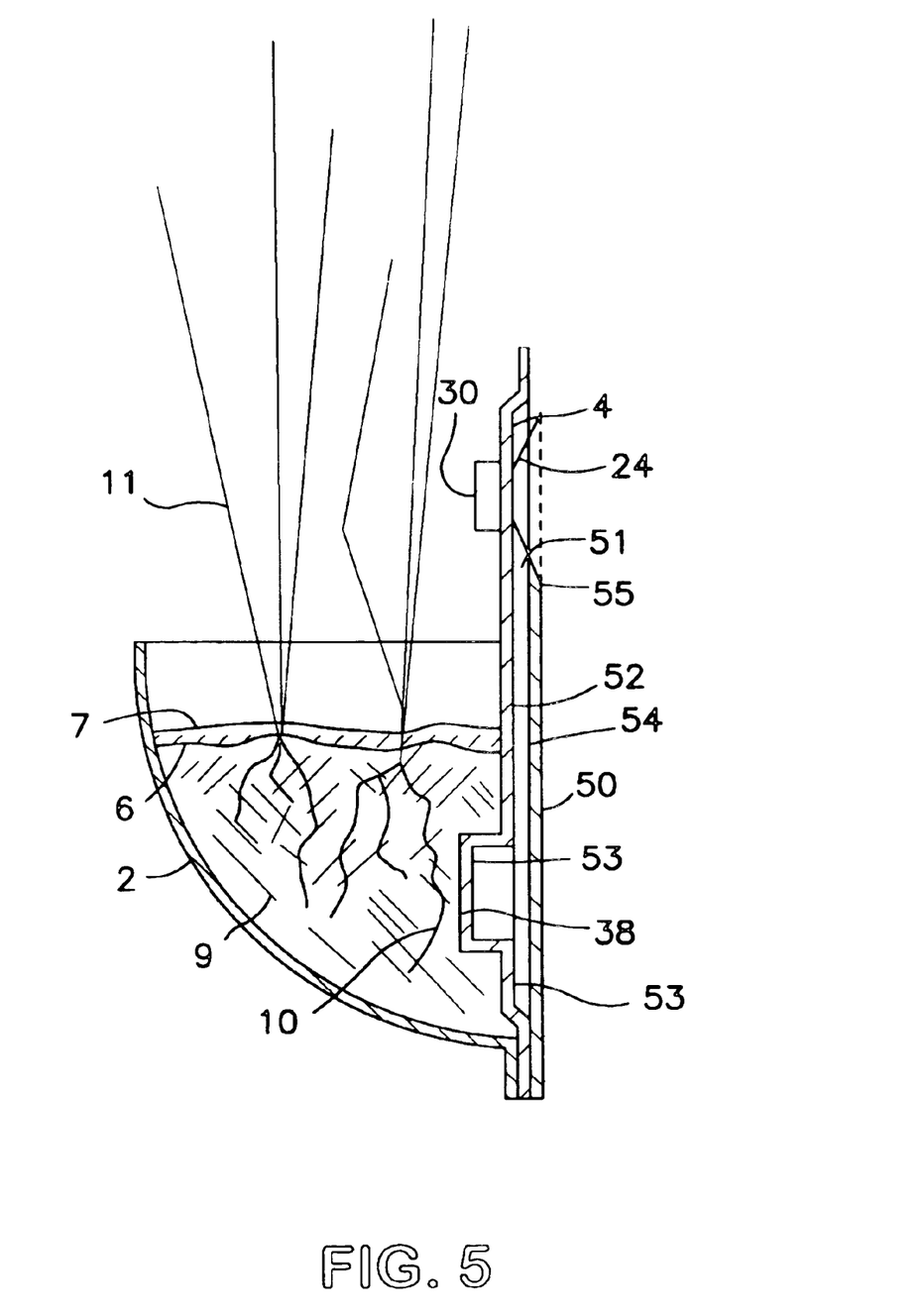
FIG. 5 is a side elevational view of a second embodiment of a plant container in accordance with the present invention.
Figure 6:
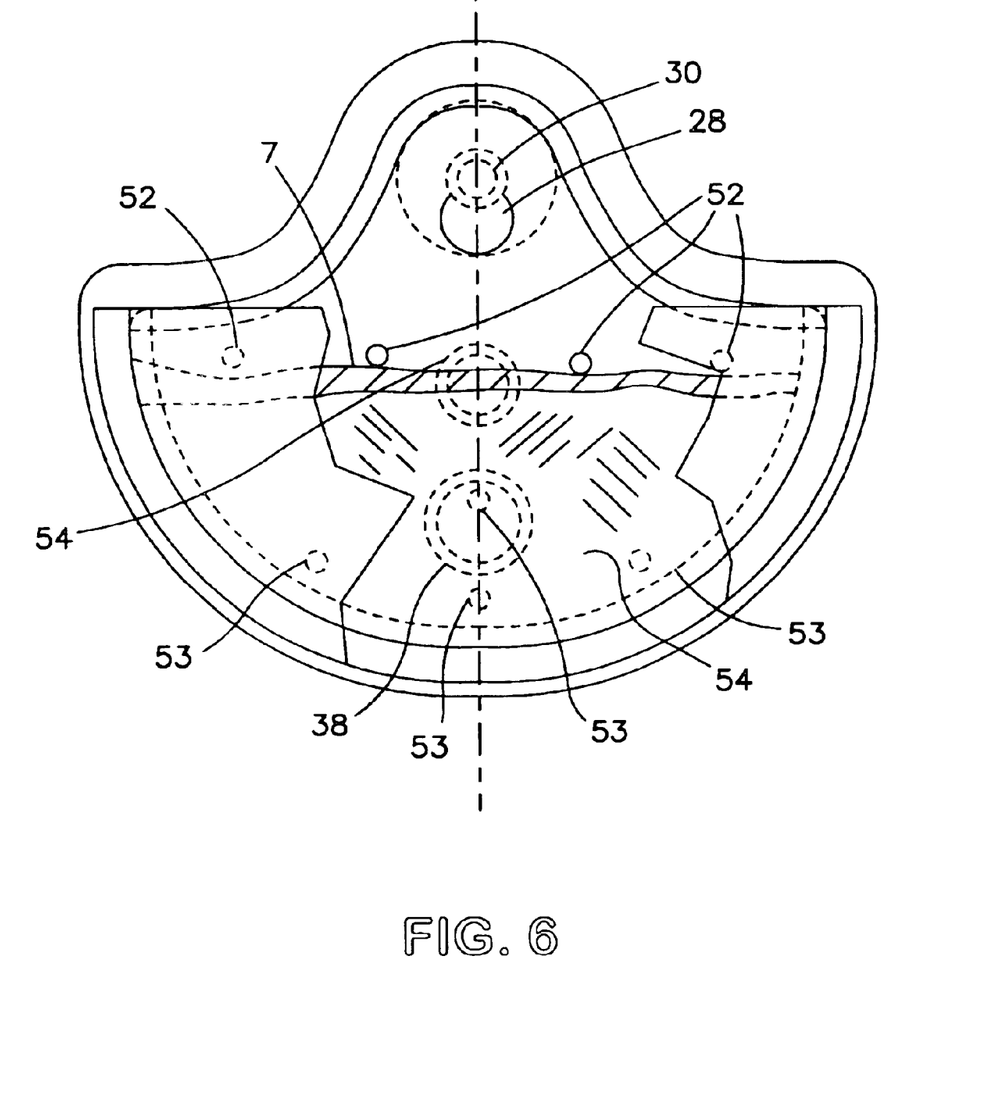
FIG. 6 is a front elevational view of the plant container illustrated by FIG. 5.

FIGS. 5 and 6 illustrate a second embodiment of a plant container in accordance with the present invention. Elements in FIGS. 5 and 6 corresponding the elements illustrated in FIGS. 1–4 will be designated by the same reference numerals. Although the FIGS. 5 and 6 embodiment show that the plant container is removably mounted to a supporting surface by a suction cup 24, having a rear portion 30 extending through a slot 28 in the rear panel 4, it is also within the scope of the invention to permanently or semi-permanently mount the plant container to a supporting surface by known adhesive materials or epoxies.

As best illustrated by FIG. 5, the plant container includes a second vertical panel 50, spaced rearwardly behind vertical panel 4, to define a space 51 between the panel 50 and a portion of the panel 4. Upper openings 52 defined in the rear panel 4 are in fluid communication with the upper portion of the cup-shaped receptacle 2. As illustrated by FIGS. 5 and 6, the upper openings 52 are defined above both the upper soil surface designated by reference numeral 6 and a layer of clay, designated by reference numeral 7, which is formed above the upper surface of the soil as will be discussed in greater detail below. The vertical panel 4, including the recessed portion 38, define lower openings 53. The lower openings are in fluid communication with the soil 9 received in the receptacle 2, in close proximity to the roots 10 of the plant 11 received in the receptacle. A raised boss 54 is provided between the vertical panels 4 and 50 to enhance the rigidity of the plant container, and to reduce warping of the plant container when it is mounted to a supporting surface.

In the embodiment illustrated by FIGS. 5 and 6, soil 9 is initially placed into the receptacle 2, and the plant 11 is rooted in the soil. Clay is initially applied above the upper surface of the soil in granular particles. Thereafter, water is poured into the opened top of the receptacle 2. The water both moistens the granular particles of clay and penetrates into the soil 2 proximate to the plant roots. The moistened clay particles thereafter dry and form a flat mat-like surface layer above the top surface of the soil 9 in the receptacle 2. Any excess water poured into the receptacle 2 overflows into the reservoir 51 through the upper openings 52. As the moisture in the mat-like clay surface evaporates, the clay hardens to form a layer above the top surface of the soil. Preferably, a layer of silicon, vegetable oil, or other moisture retarding substances are sprayed above the top hardened clay layer to form a water impermeable barrier 7 above the top surface of the soil. Thereafter, water poured into the opened top of the receptacle 2 will not penetrate through the layer 7, but will overflow into the reservoir 51 through the upper openings 52. The water in the reservoir 51 is introduced into the soil 9 proximate to the roots 10 of the plant 11 through the lower openings 53. The water introduced into the soil 9 through the lower openings 53 is retained in the soil by the water impermeable upper layer 7. The opening 55 defined at the top of the reservoir 51 permits air to be vented from the reservoir when water is introduced into the reservoir through the upper openings 52.

The capacity of the reservoir is enhanced as a result of the increased volume provided by the inwardly recessed portion 38 of the vertical panel 4. Preferably, at least one opening 53 is defined in the recessed portion 38 to provide fluid communication between the recessed portion and the soil within the receptacle 2. The recessed portion 38, which extends into the soil 9, serves a further function by helping to retain the soil within the receptacle 2 in the event that the plant container is inverted.

The embodiment of the plant container disclosed by FIGS. 5 and 6 provides means for assuring that the moisture content of the soil is maintained at a desired level to promote adequate plant growth, while minimizing the frequency at which the soil requires watering. The plant container is designed to provide continuous watering of the plant by the water retained in the reservoir 51, and to retain moisture in the soil as a result of water impervious barrier formed above the upper surface of the soil. If desired, surfactants or other moisture retaining products can be mixed with the soil to enhance the water retention therein.

Figure 7:
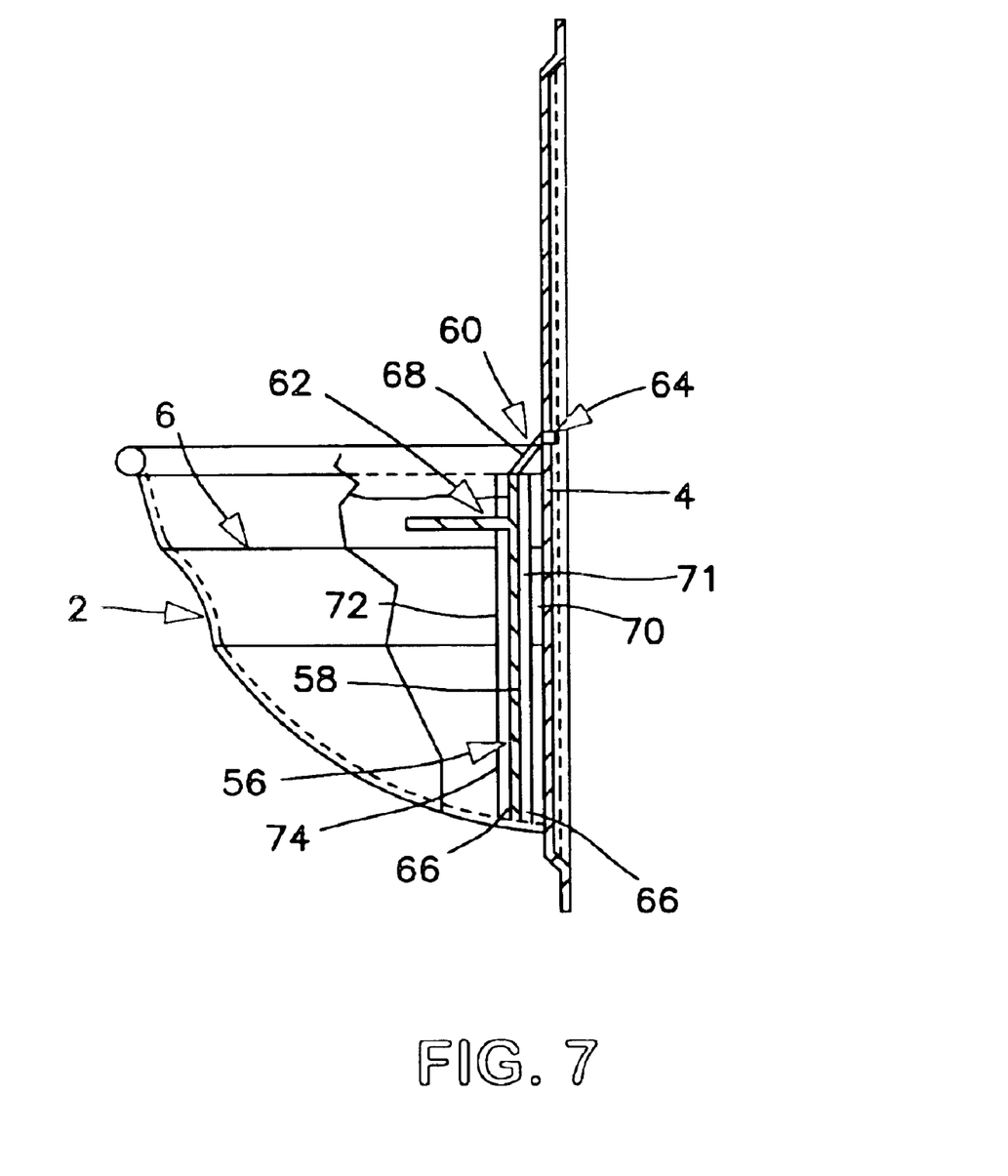
FIG. 7 is a side elevational view of a third embodiment of a plant container in accordance with the present invention.
Figure 8:
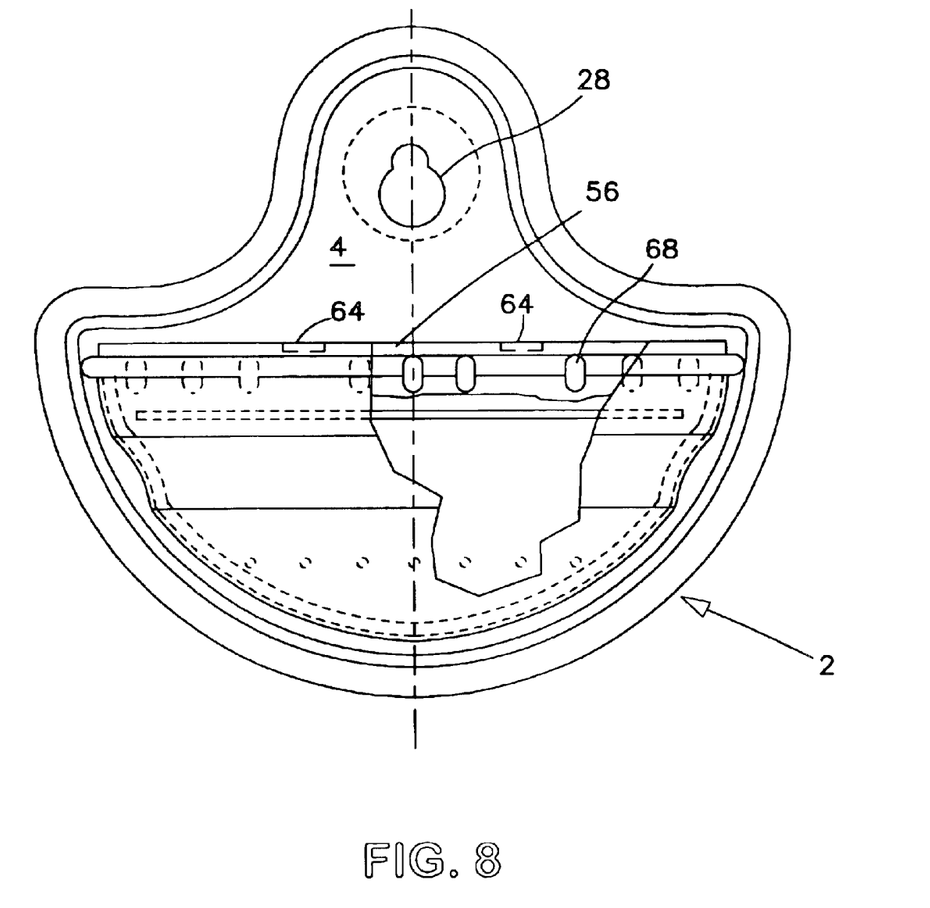
FIG. 8 is a front elevational view, partially in section, of the plant container illustrated by FIG. 7.

FIGS. 7 and 8 illustrate a further embodiment of a plant container in accordance with the present invention. An insert, generally designated by reference numeral 56 includes a vertical plate 58 having an upper angled portion 60 and a horizontal extension 62 extending into the plant container or receptacle 2. At least one locking tab 64 extends horizontally and rearwardly from the upper portion of angled section 60, and is removably insertable into a corresponding opening (not shown) defined in the rear panel 4 of the plant container. The components 58, 60, 62, and 64 of the insert 56 are integrally joined to each other so that the insert 56 is formed from a single unit. The bottom end of the vertical plate 58 is retained on the bottom surface of the receptacle 2 by two opposed raised ribs 66 defined on the bottom of the receptacle. Therefore, the insert is removably locked into the position shown in FIG. 7 by the upper locking tabs 64 and the lower raised ribs 66. At least one opening 68 is defined in the upper angled portion 60 of the insert 56. The horizontal plate 62 extending into the receptacle 2 is oriented to be above the top layer 6 of soil received in the receptacle 2. The horizontal plate 62 can define a cut-out section proximate to its midpoint for facilitating access to the soil beneath this plate.

Similar to that discussed with respect to FIGS. 5 and 6, FIG. 7 illustrates a vertical reservoir 71 defined between two opposed vertical walls 70 and 72. As also discussed with respect to FIGS. 5 and 6, at least one opening 74 is defined proximate to the bottom of the front vertical wall 72 to provide fluid communication between water in the vertical reservoir 71 and the soil in the receptacle 2. As shown in FIG. 7, the vertical plate 58 of the insert 56 is received in the vertical reservoir 71.

In operation, the insert 56 is removably inserted into the receptacle 2 by inserting the vertical plate 58 into the vertical reservoir 71 such that the bottom end of the vertical plate 58 is retained between the two opposed raised ribs 66 disposed on the bottom surface of the receptacle at the bottom of the vertical reservoir 71. The locking tabs 64 extending from the top of the insert 56 are removably inserted into the corresponding openings in the rear panel 4 of the plant container. In this manner, the insert 56, which is an integral unit, is removably locked into the plant container. As discussed with respect to the embodiment of the invention illustrated by FIGS. 5 and 6, the upper surface 6 of the soil in the receptacle 2 defines a hardened, water impermeable barrier such that the top layer of the soil forms a single mass. As noted above, the forwardly extending horizontal plate 62 is orientated to be above (or abutting against) the top layer of soil when the insert 56 is removably received within the receptacle 2. Therefore, the horizontal plate 62 acts as a retaining element, engaging the hardened top layer of the soil and preventing the soil from spilling out of the opened top of the receptacle, in the event that the receptacle is tilted or inverted from the position illustrated in FIG. 7. It is within the scope of the invention to orientate the top plate 62 to be spaced slightly above the top layer 6 of the soil, or in the alternative, to directly engage the top layer 6 of the soil so that no space is defined between the retaining plate 62 and the top layer of the soil. It is also within the scope of the present invention to apply an adhesive material between the lower surface of the retaining plate 62 and the portion of the top layer 6 of the soil which engages the lower surface of the retaining plate 62.

The openings 68 defined in the upper portion 60 of the insert 56 are directly above the reservoir 71 and thus in fluid communication with the reservoir 71 defined therebelow. Accordingly, the openings 68 define watering openings through which water is poured to replenish the water in the reservoir 71.

The embodiment of the plant container illustrated by FIGS. 7 and 8 is removably mounted to a supporting surface in the same manner discussed previously herein with respect to the embodiments of the invention illustrated by FIGS. 1–6. FIG. 8 illustrates a mounting opening or slot 28 defined proximate to the top of the rear panel 4 of the plant container.

The embodiment of the plant container illustrated by FIGS. 7 and 8 provides a removable insert for retaining soil within the receptacle 2 of the plant container, as for example when the plant container is being transported from one location to another, or when it is being moved, at the selection of the user, from one supporting surface to another. In this manner, the plant containers can be manufactured at a production facility, and the soil can be added to the receptacle at the production facility. The plant container, together with the soil contained therein, can thereafter be transported, as single unit, from the production facility to retail sales outlets or directly to the ultimate consumer. As a result, the consumer receives a complete plant container with soil, avoiding the inconvenience of having to separately add the soil to the receptacle after the product has been purchased.

Other modifications and advantages within the scope of the present invention will become apparent to those skilled in the art. Accordingly, the preferred embodiments discussed herein are intended to be illustrative only, and not restrictive of the scope of the invention, that scope being defined by the following claims and all equivalents thereto.

What is claimed is:

1. A plant container comprising:
    a receptacle for receiving soil therein;
    said receptacle having a rear panel thereon;
    means for mounting said rear panel of said receptacle to a supporting surface;
    retaining means operatively associated with said receptacle for retaining soil in said receptacle;
    a reservoir defined within said receptacle, said means for retaining soil in said receptacle received, at least in part, in said reservoir;
    said means for retaining including an engagement element adapted to engage at least a portion of an upper layer of soil received within said receptacle;
    said means for retaining further including a vertical element connected to said engagement element, said vertical element adapted to be received in said reservoir such that said engagement element is above the upper layer of soil in said receptacle when the bottom end of said vertical element engages the bottom of said reservoir.

2. The plant container as claimed in claim 1, wherein said means for mounting said rear panel to a supporting surface includes means for removably mounting said rear panel to a supporting surface.

3. The plant container as claimed in claim 1, wherein said upper layer of soil received within said receptacle is a solid mass, and said engagement element of said means for retaining engages said solid mass of said upper layer of soil.

4. The plant container as claimed in claim 1 further including the guide means defined at the bottom of said reservoir for receiving and retaining said vertical element in a predetermined position within said reservoir.

5. The plant container as claimed in claim 4, wherein said guide means comprises at least two opposed raised ribs extending upwardly from the bottom surface of said reservoir, the bottom end of said vertical element of said means for retaining being removably received between said two opposed raised ribs.

6. The plant container as claimed in claim 1, wherein said means for retaining includes an upper element extending from the top end of said vertical element.

7. The plant container as claimed in claim 6, wherein said upper element includes locking means for removably locking said upper element to said rear panel of said plant container.

8. The plant container as claimed in claim 7, wherein said locking means includes at least one locking tab adapted to be removably insertable into a corresponding opening defined in said rear panel of said plant container.

9. The plant container as claimed in claim 6, wherein said upper element of said means for retaining is disposed above the top of said reservoir defined in said plant container.

10. The plant container as claimed in claim 9, wherein at least one opening is defined in said upper element of said means for retaining, said opening being in fluid communication with said reservoir for replenishing the contents of said reservoir through said at least one opening.

11. The plant container as claimed in claim 6, wherein said engagement element, said vertical element, and said upper element of said means for retaining are integrally joined together to form a single unit.

12. The plant container as claimed in claim 11, wherein said engagement element of said means for retaining is oriented at a substantially perpendicular angle to said vertical element, and said upper element extends from said vertical element at an angle other than perpendicular.

13. The plant container as claimed in claim 1, further including means for removably mounting said means for retaining in said receptacle.

14. A plant container comprising:
    a receptacle for receiving soil therein;
    said receptacle having a rear panel thereon;
    means for removably mounting said rear panel of said receptacle to a supporting surface; and
    retaining means operatively associated with said receptacle for retaining soil in said receptacle;
    said retaining means being removably mountable within said receptacle;
    said retaining means comprising a vertical element, an engagement element extending from said vertical element and oriented to be above the upper layer of soil in said receptacle, and an upper element extending from the top of the vertical element;
    said receptacle defining a reservoir therein, and said upper element of said means for retaining being disposed above the top of said reservoir when said means for retaining is removably received within said receptacle.

15. The plant container as claimed in claim 14, wherein said upper element of said means for retaining defines at least one opening therein, said at least one opening being in fluid communication with said reservoir for replenishing fluid in said reservoir through said at least one opening.

16. A plant container comprising:
    a receptacle for receiving soil therein;
    said receptacle having a rear panel thereon;
    means f or removably mounting said rear panel of said receptacle to a supporting surface;
    retaining means operatively associated with said receptacle for retaining soil in said receptacle;
    said retaining means including a vertical element, an engagement element extending from said vertical element and oriented above the upper layer of soil in said receptacle, and an upper element extending from the top of said vertical element; and
    means for releasably locking said retaining means in said plant container.

17. The plant container as claimed in claim 16, wherein said means for releasably locking said retaining means in said plant container includes guide means in said receptacle for receiving the bottom end of said vertical element therein, and at least one locking tab at the top of said upper element releasably insertable into at least one corresponding opening defined in said rear panel of said plant container.

* * * * *